(12) United States Patent
Martin

(10) Patent No.: US 6,234,282 B1
(45) Date of Patent: May 22, 2001

(54) BRAKE DISK FOR A MOTOR VEHICLE

(75) Inventor: Roland Martin, Weissach (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/289,059

(22) Filed: Apr. 12, 1999

(30) Foreign Application Priority Data

Apr. 11, 1998 (DE) .............................................. 198 16 381

(51) Int. Cl.[7] .................................................... F16D 65/10
(52) U.S. Cl. ................................ 188/218 XL; 188/4 B; 188/71.6; 188/26 A
(58) Field of Search .................... 188/4 B, 71.6, 188/218 XL, 242, 243, 264 A, 264 AA

(56) References Cited

FOREIGN PATENT DOCUMENTS

| 699 845 | 3/1996 | (EP) . |
| 717 214 | 6/1996 | (EP) . |
| 95/30841 | 11/1995 | (WO) . |

Primary Examiner—Robert J. Oberleitner
Assistant Examiner—Devon Kramer
(74) Attorney, Agent, or Firm—Evenson, McKeown, Edwards & Lenahan, P.L.L.C.

(57) ABSTRACT

A brake disk for a motor vehicle, particularly made of a fiber-glass-reinforced material, includes two disk elements with ribs forming air ducts, which can be connected with one another. The ribs of the disk elements have mutually corresponding hook-type connections on opposite front surfaces.

10 Claims, 3 Drawing Sheets

BRAKE DISK FOR A MOTOR VEHICLE

BACKGROUND AND SUMMARY OF THE INVENTION

This application claims the priority of German patent 198 16 381.9, filed Apr. 11, 1998, the disclosure of which is expressly incorporated by reference herein.

The invention relates to a brake disk for a motor vehicle particularly consisting of a fiber-reinforced material, which comprises two disk elements with ribs forming air ducts, which can be connected with one another.

From German Patent Document DE-OS 1 940 669, a brake disk is known which has two disk elements which, for the connection, have holding devices on intermediate ribs which form air ducts.

It is an object of the invention to provide a brake disk which comprises disk elements which consist of a fiber-reinforced material and which can be connected with one another in a simple manner without the use of holding devices.

According to the invention, this object has been achieved by providing a brake disk for a motor vehicle, comprising two disk elements with ribs defining air ducts, which can be connected with one another, wherein the ribs of the disk elements have mutually corresponding hook-type connections on opposite front surfaces.

Certain principal advantages achieved by of the invention are that the disk halves of the brake disk are constructed of a fiber-reinforced material with a special structure of the connection surfaces on the front surfaces and/or side surfaces of the ribs for the air ducts. These connection surfaces form a so-called hook-in or interlocking connection, whereby the joining of the two disk elements can take place in a mutually centered and form-locking manner.

For this purpose, the connection surfaces of the individual ribs of each disk element can be provided with steps which can be fitted into one another, or the connection of the opposed ribs takes place by means of a groove/tongue connection or by way of mutually corresponding indentations and elevations, as, for example, by way of a V-shaped indentation and a correspondingly constructed opposite V-shaped molded-on portion (projection).

The steps have approximately a depth corresponding to half the rib thickness and end preferably at a distance from the central opening of the brake disk ring or the rib base.

The steps in the ribs can be alternately arranged such that at least one left-side step is followed by a right-side step. Several identical left-side steps can also follow several identical right-side steps.

By means of this alternate arrangement of the steps, the disk elements can be arranged in a precise manner with respect to one another for the connection. The connection of the ribs takes place, for example, in a high-temperature furnace in which the two disk halves are intimately connected with one another by a so-called gluing-together or the like of the fiber-reinforced material.

The ribs of the air ducts may have different lengths, according to the invention, one shorter rib respectively being provided between two continuous ribs. All ribs have a hook-type connection. In addition, perforations, such as bores and the like, can be provided in the disk elements, particularly in the friction surfaces.

Other objects, advantages and novel features of the present invention will become apparent from the following detailed description of the invention when considered in conjunction with the accompanying drawings.

DETAILED DESCRIPTION OF THE DRAWINGS

Figure 1:
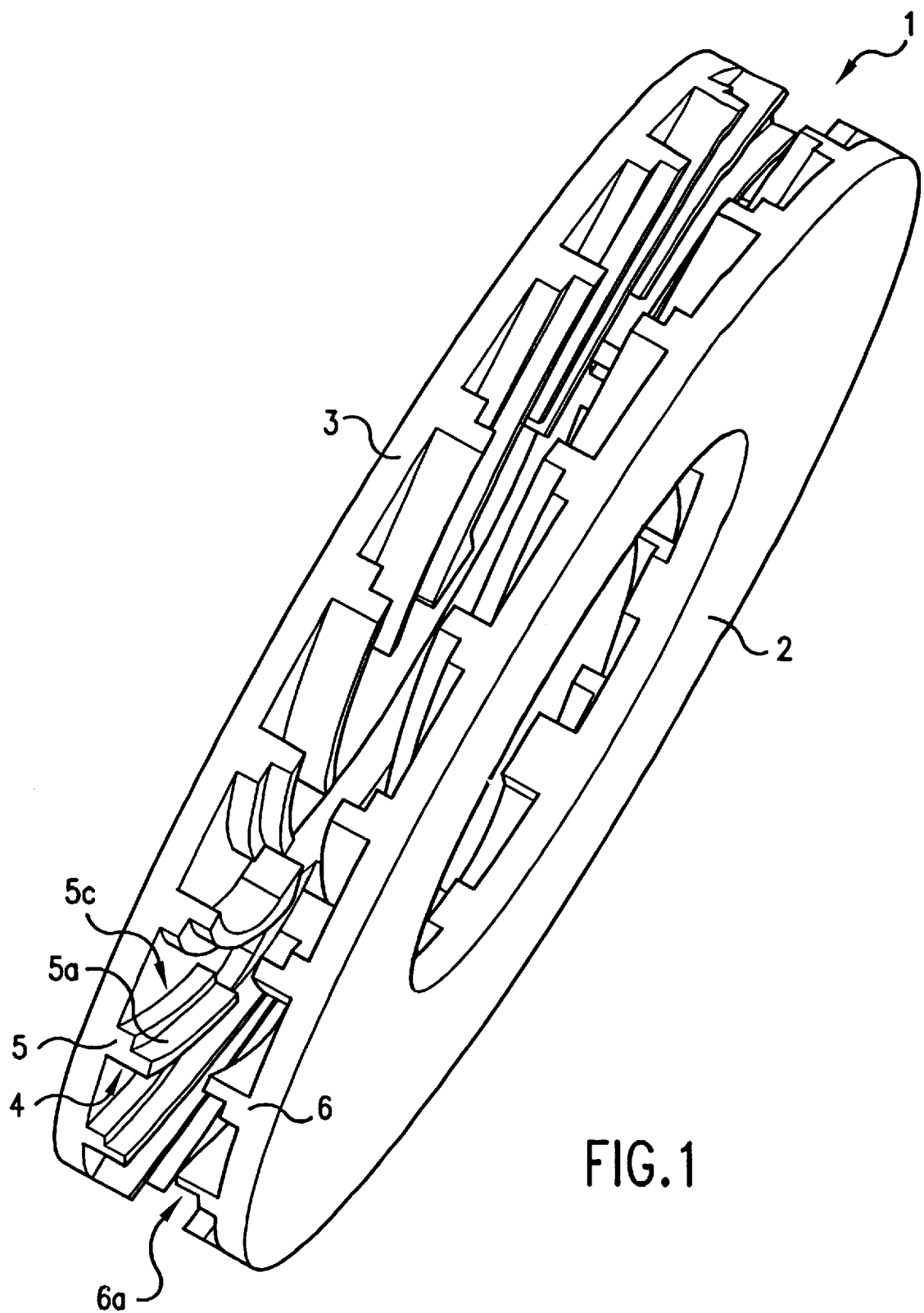
FIG. 1 is a perspective view of a brake disk according to a preferred embodiment of the present invention, comprising two disk elements which have hook-type connections, in an unconnected position.
Figure 2:
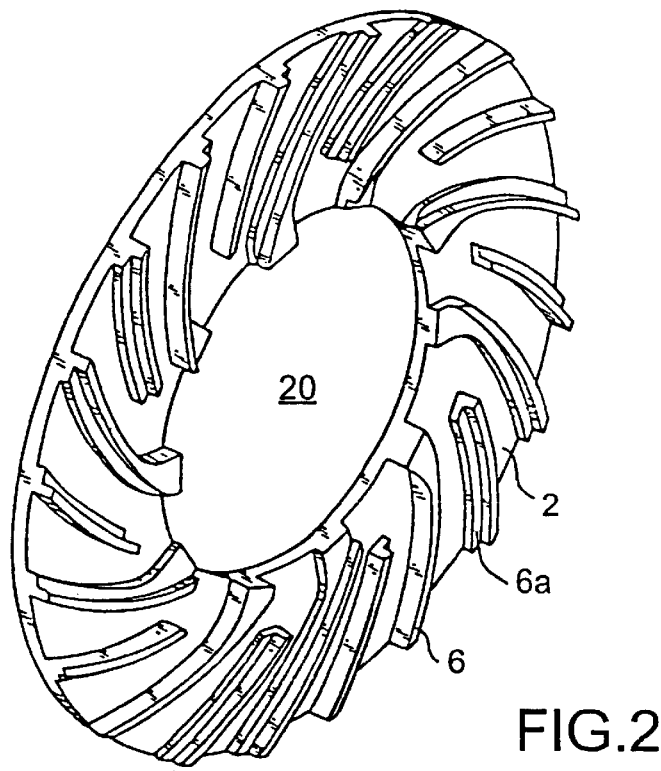
FIG. 2 is a view of one of the disk elements of FIG. 1.
Figure 3:
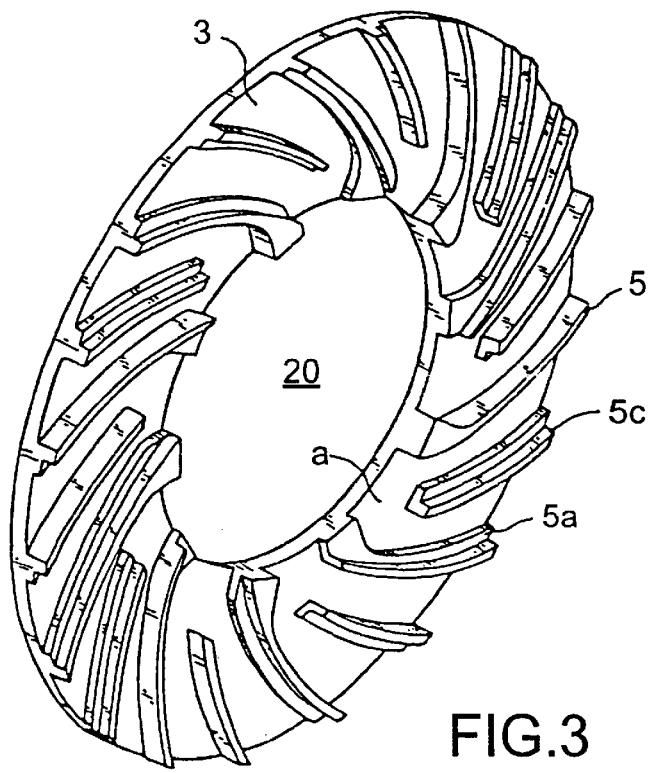
FIG. 3 is a view of the other of the disk elements of FIG. 1.

Referring to FIGS. 1–4, a brake disk 1 comprises essentially two disk elements 2, 3 which are connected with one another by way of a hook-type connections 4. These connections 4 are provided in the respective ribs 5, 6 of the two disk elements 2, 3.

The disk elements 2 and 3 have a plurality of ribs 5, 6 which form air ducts in the connected state. These ribs extend from the center of the disk elements 2, 3 toward the outside. They are constructed to be partially continuous over the whole surface of the friction ring and are partially shortened (rib 5c), as illustrated in detail in FIGS. 2 and 3. Each rib is provided with a hook-type connection 4.

Figure 4:
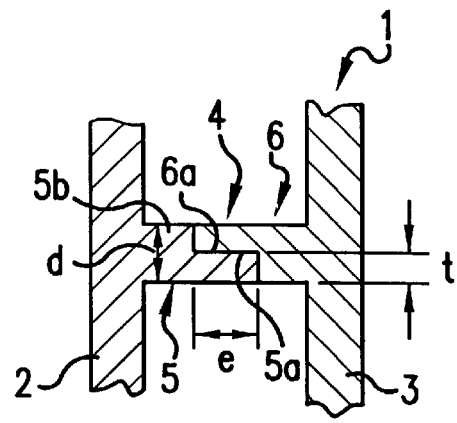
FIG. 4 is a sectional view of one of the hook-type connections of FIG. 1 in a connected position.

On their front surfaces to be connected, the ribs 5, 6 each have a stepping 5a and 6a, whose surfaces are disposed on one another for the connection, as illustrated in detail in FIG. 4. These steps may be arranged to alternate, for example, from rib to rib, so that a defined mutual fixing of the disk elements 2, 3 is obtained. As illustrated in FIG. 1, at least two ribs which follow one another may also be provided with a stepping in the same direction, whereas then steps will follow which have a stepping in the opposite direction.

The depth t of the stepping 5a, 6a corresponds to at least half the thickness d of the rib. The length e of the stepping is selected such that an area with the full rib thickness d remains at the brake disk ring as the rib base 5b.

Figure 5:
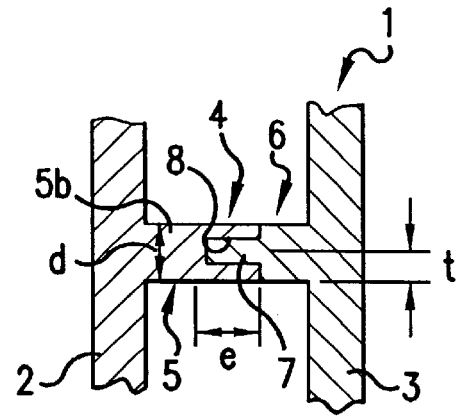
FIG. 5 is a sectional view of a preferred embodiment with tongue-and-groove hook-type connections in a connected position.

Alternatively, the hook-type connection 4 may be a tongue-and-groove connection, as shown in FIG. 5. A tongue 7 is formed on rib 6, and a mating groove 8 for receiving the tongue 7 is formed in rib 5.

Figure 6:
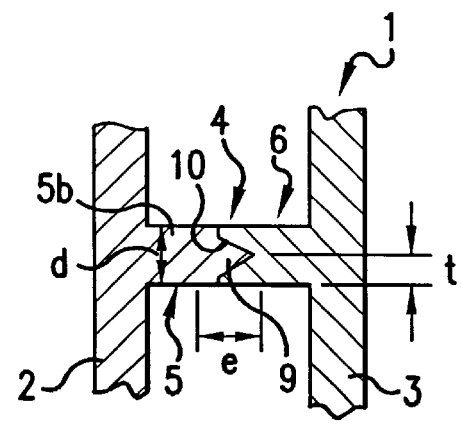
FIG. 6 is a sectional view of a preferred embodiment with V-shaped hook-type connections in a connected position.

Alternatively, the hook-type connection 4 may be a V-shaped connection, as shown in FIG. 6. A V-shaped projection 9 is formed on rib 5, and a mating V-shaped indentation 10 for receiving the projection 9 is formed on rib 6.

In the area of the ribs 5, 6, 5c, bores can be arranged in the friction surface which extend in a regular and/or irregular manner over the whole surface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disk for a motor vehicle, comprising:
   a first brake disk part having a first set of rib parts protruding from an axial end face of said first brake disk part, and a second brake disk part having a second set of rib parts protruding from an axial end face of said second brake disk part, said first and second brake disk parts being connected together along respective ones of the rib parts of the first and second sets of rib parts to form ribs which form radially extending air channels between the first and second brake disk parts, wherein opposed rib faces of the respective rib parts are connected with one another along corresponding stepped sections mated together and having a combined thickness corresponding to adjoining sections of the rib parts, and wherein the stepped sections extend along an entire length of the rib parts and ribs formed thereby.

2. A brake disk for a motor vehicle according to claim 1, wherein the stepped section at each of adjoining rib parts have a thickness in a direction through the rib formed thereby of approximately half the thickness of said rib.

3. A brake disk for a motor vehicle according to claim 1, wherein each of said rib parts have a base portion adjoining a respective brake disk part and a stepped portion forming the stepped portion which overlaps with a corresponding stepped section of the rib part extending from the other brake disk part.

4. A brake disk for a motor vehicle according to claim 3, wherein the stepped portions are formed with respective steps at one of a right-side and a left-side of a respective rib part.

5. A brake disk for a motor vehicle according to claim 4, wherein the stepped sections are formed such that alternative left-side and right-side steps are provided on rib parts forming adjacent ribs.

6. A brake disk for a motor vehicle according to claim 1, wherein said disk parts are formed of a fiber reinforced material.

7. A brake disk for a motor vehicle according to claim 2, wherein said disk parts are formed of a fiber reinforced material.

8. A brake disk for a motor vehicle according to claim 3, wherein said disk parts are formed of a fiber reinforced material.

9. A brake disk for a motor vehicle according to claim 4, wherein said disk parts are formed of a fiber reinforced material.

10. A brake disk for a motor vehicle according to claim 5, wherein said disk parts are formed of a fiber reinforced material.

* * * * *